United States Patent
Neubert

(10) Patent No.: US 10,202,242 B2
(45) Date of Patent: Feb. 12, 2019

(54) APPARATUS FOR TREATING A MOLDED OBJECT

(71) Applicant: Mike Neubert, Dautphetal (DE)

(72) Inventor: Mike Neubert, Dautphetal (DE)

(73) Assignee: EHA COMPOSITE MACHINERY GMBH, Steffenberg (DE)

(*) Notice: Subject to any disclaimer, the term of this patent is extended or adjusted under 35 U.S.C. 154(b) by 130 days.

(21) Appl. No.: 15/161,664

(22) Filed: May 23, 2016

(65) Prior Publication Data

US 2016/0340126 A1    Nov. 24, 2016

(30) Foreign Application Priority Data

May 22, 2015   (EP) ..................... 15169017

(51) Int. Cl.
| | |
|---|---|
| B65G 37/00 | (2006.01) |
| F26B 15/14 | (2006.01) |
| B29C 31/00 | (2006.01) |
| B29C 71/02 | (2006.01) |
| B65G 17/32 | (2006.01) |
| B65G 17/38 | (2006.01) |

(52) U.S. Cl.
CPC .......... B65G 37/005 (2013.01); B29C 31/00 (2013.01); B29C 71/02 (2013.01); B65G 17/32 (2013.01); B65G 17/38 (2013.01); F26B 15/14 (2013.01)

(58) Field of Classification Search
CPC ...... B65G 37/005; B65G 17/32; B65G 17/38; B29C 31/00; B29C 71/02; F26B 15/14
See application file for complete search history.

(56) References Cited

U.S. PATENT DOCUMENTS

| | | | | |
|---|---|---|---|---|
| 2,570,150 | A | * | 10/1951 | Osojnak ................... A21B 1/46 198/797 |
| 2,616,549 | A | | 11/1952 | Ornitz |
| 2,663,281 | A | | 12/1953 | Wright |
| 2,803,332 | A | | 8/1957 | Hagerman |
| 2,997,739 | A | | 8/1961 | Smith |
| 3,192,646 | A | | 7/1965 | Brown |
| 3,365,158 | A | * | 1/1968 | Dowling ................ B65G 17/42 118/500 |

(Continued)

FOREIGN PATENT DOCUMENTS

NL          6716975 A     6/1969

*Primary Examiner* — Michael N Orlando
*Assistant Examiner* — Cynthia L Schaller
(74) *Attorney, Agent, or Firm* — Andrew Wilford

(57) ABSTRACT

An apparatus for treating molded objects all having a predetermined object length in a treatment station has first and second transversely spaced conveyor strands extending longitudinally in a travel direction into the treatment station for displacing the object in the travel direction into the treatment station. Respective first and second holding bolts are supported by the respective strands and secured in respective ends of the objects with the objects extending transversely between the strands. A plurality of longitudinally spaced and transversely extending support elements are fixed to and longitudinally displaceable with the first strand. The first bolts are supported on the elements that each have a transverse length equal to at least 30% of the length of the first holding bolt between the respective end of the respective molded object and the first conveyor strand, or 10% of the length of the molded objects, or 30 mm.

14 Claims, 6 Drawing Sheets

(56) References Cited

U.S. PATENT DOCUMENTS 4,129,206 A * 12/1978 Talbott ................ B65G 17/24
                                                  101/40
5,272,970 A * 12/1993 Burke ................. F26B 15/128
                                                  101/37

* cited by examiner

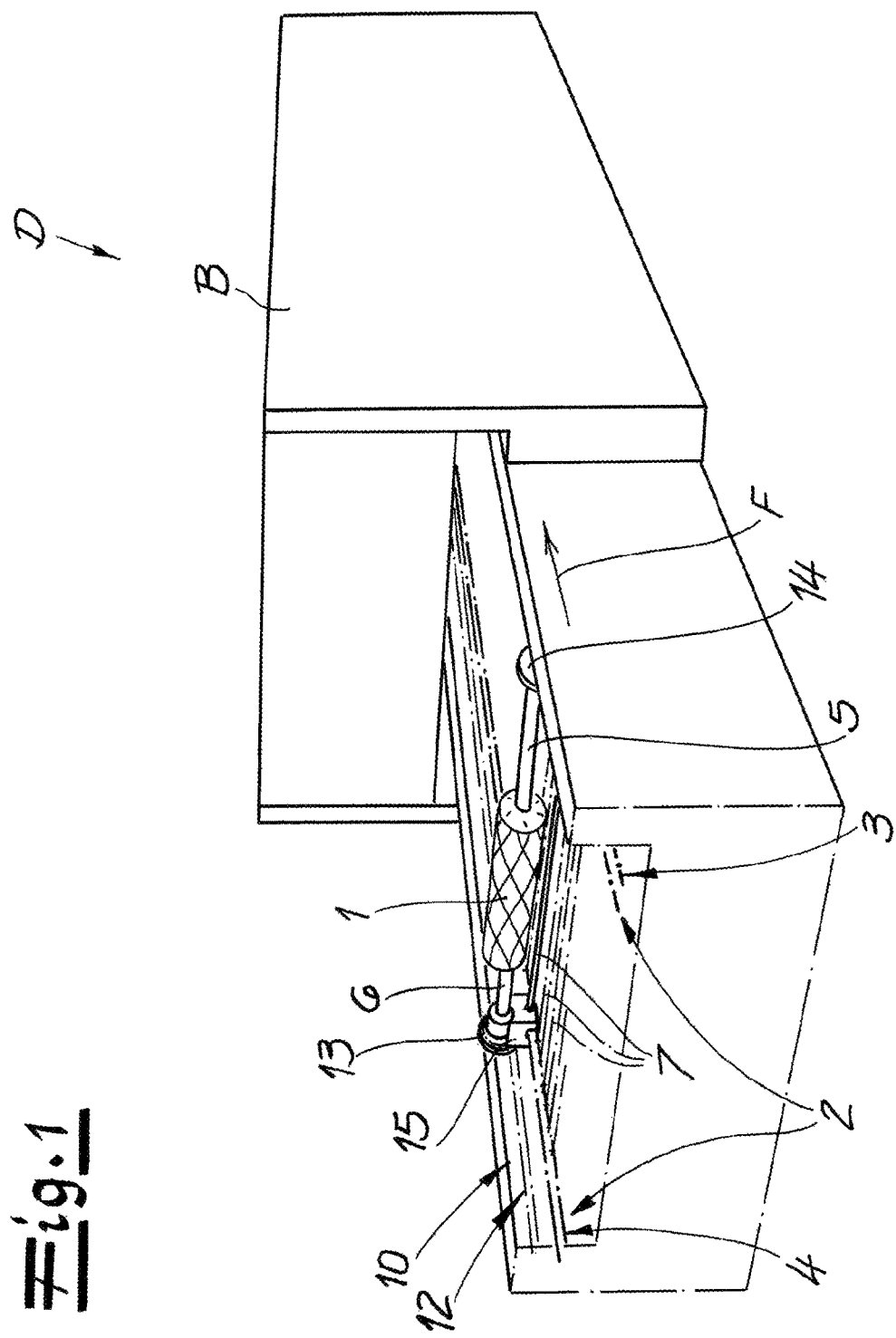

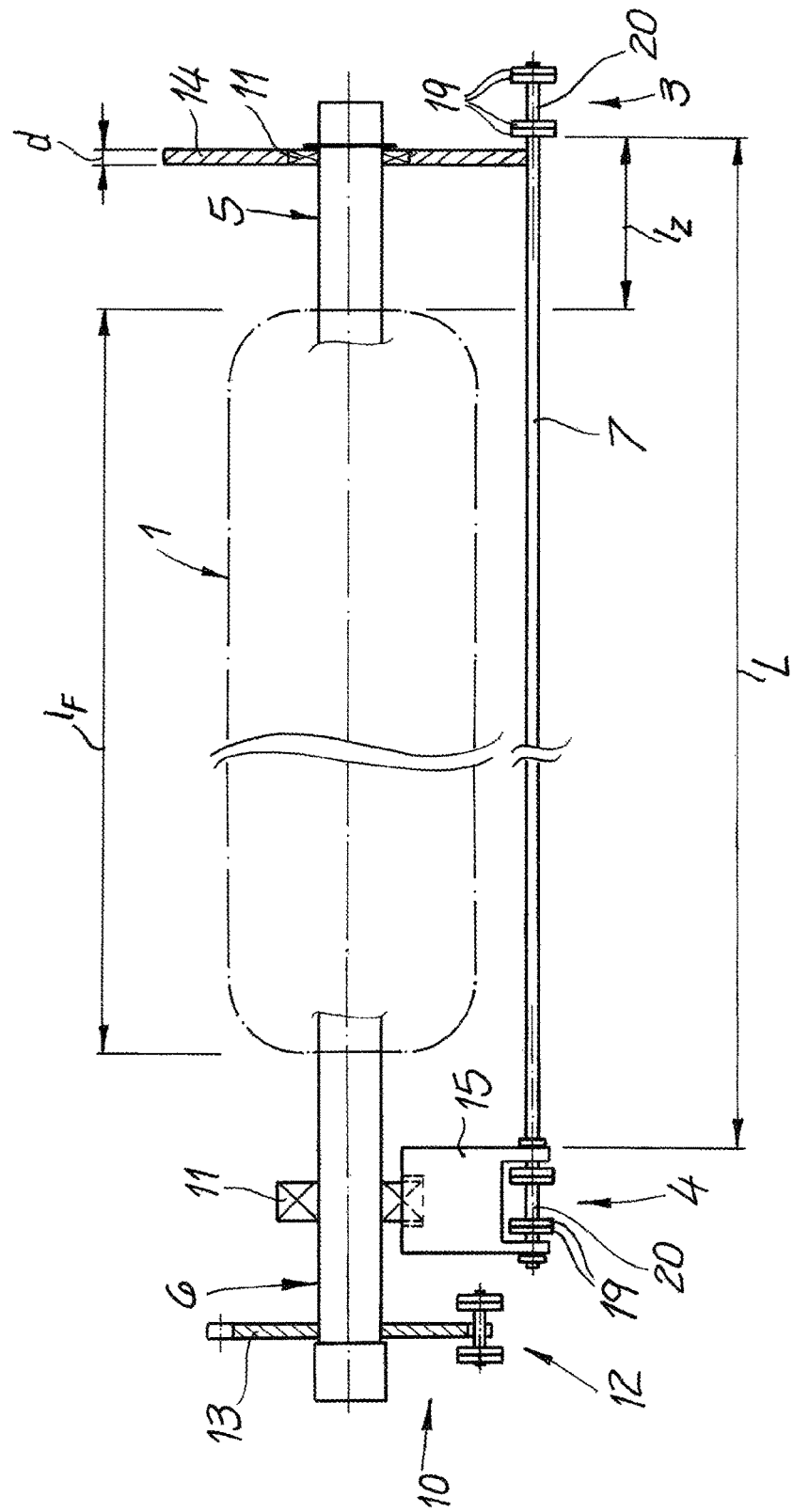

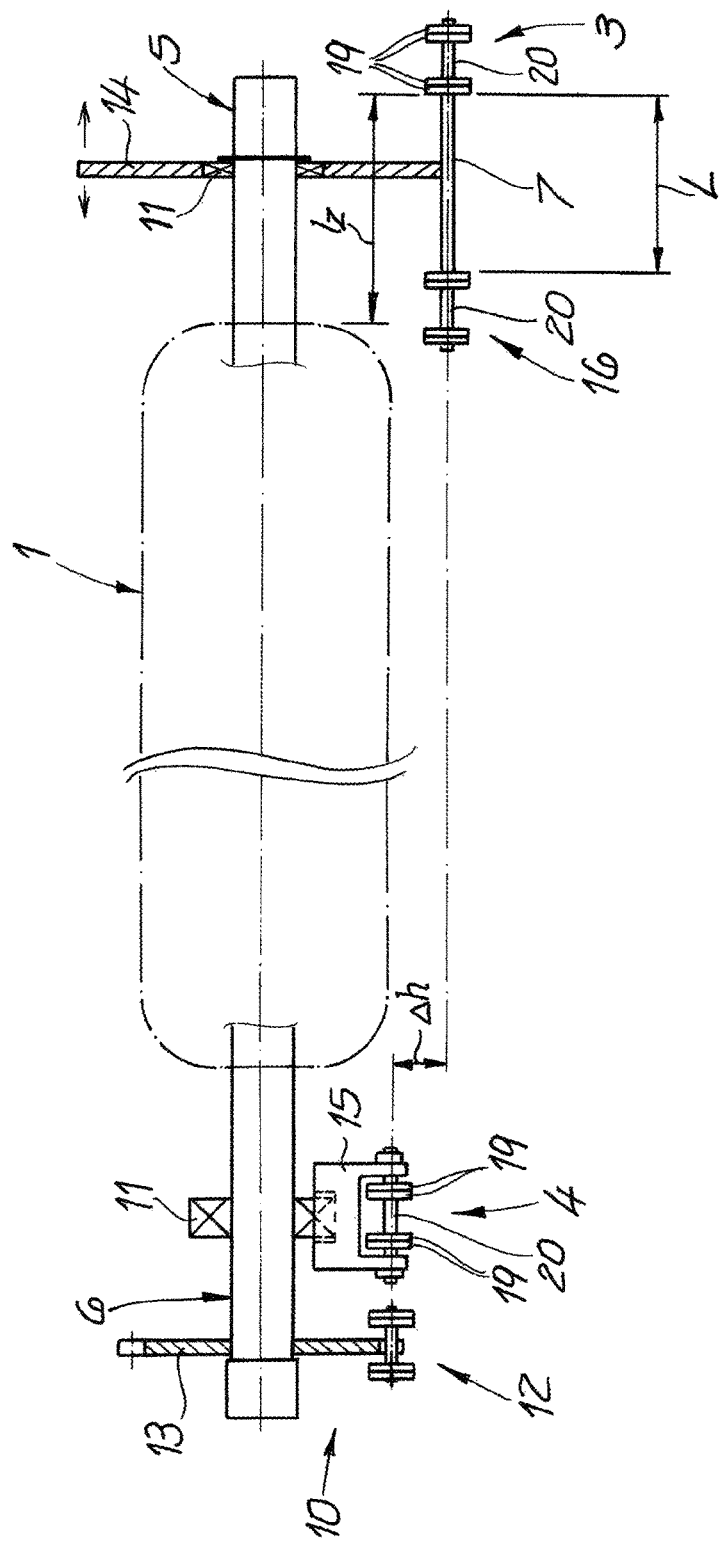

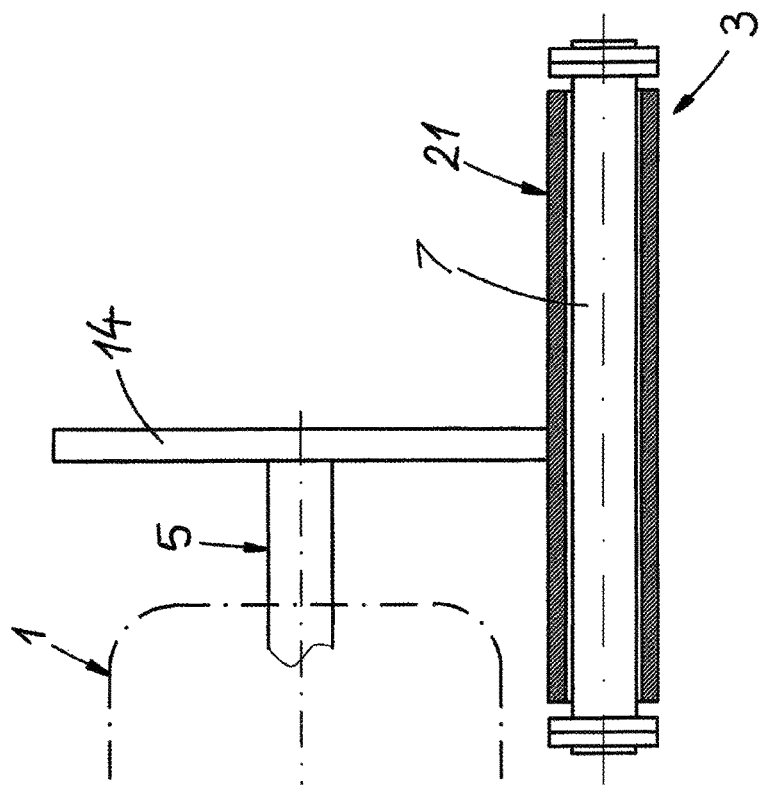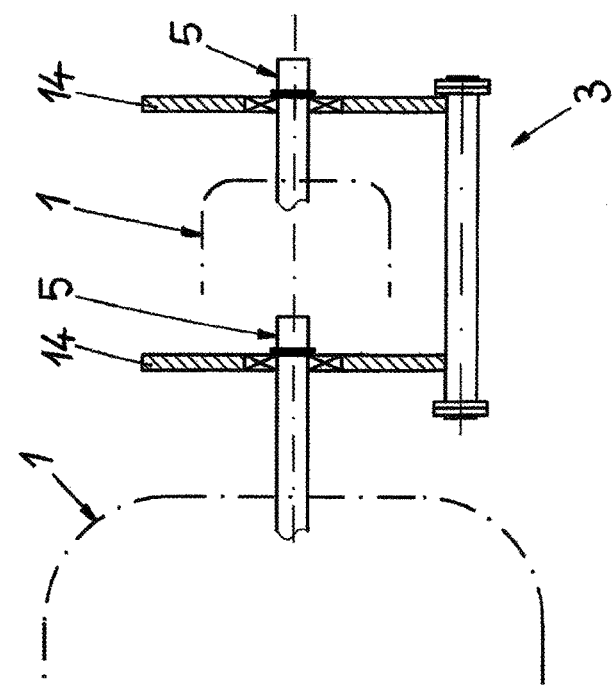

APPARATUS FOR TREATING A MOLDED OBJECT

FIELD OF THE INVENTION

The present invention relates to an apparatus for treating a molded object. More particularly this invention concerns a system for passing an object to be treated, for instance painted, through a treatment chamber.

BACKGROUND OF THE INVENTION

Such an apparatus normally has at least one treatment station into which molded objects may be moved for treatment by a conveyor, wherein the conveyor has at least two conveyor strands extending in the travel direction of the molded object, wherein at least one conveyor strand—preferably at least two conveyor strands—can be moved in the travel direction of the molded object. In the scope of the invention, molded object means in particular voluminous molded parts whose lengths transversely to the travel direction as a rule are greater than in the travel direction. However, the length of the molded objects can basically be the same both in the travel direction and transversely to the travel direction. The molded objects for example can be containers, pipes or the like. In the scope of the invention, treatment means in particular the treatment of the surfaces of the molded objects and above all the heat treatment of these surfaces, as well as coating, for example painting of the molded object surfaces.

An apparatus for treating a molded objects of the above-described type is basically known in practice. With this known apparatuses, as a rule two conveyor strands in the form of drive chains or transport chains are provided that extend in the travel direction. Respective holding bolts are each connected at opposite ends of the molded objects to the drive chains via mounts in the form of seats. The molded objects are in particular essentially cylindrical coil cores that have wound fiber strands impregnated with liquid duroplast plastic on their surface. The treatment station is a hardening chamber of a treatment oven and/or a coating station, for example as a painting station. The molded objects are guided by the conveyor strands through the treatment oven for hardening of the liquid plastic and/or through the coating station for coating of the possibly already hardened plastic. The holding bolts of the molded objects are each connected via a respective pivot bearing to the seat of the respective drive chain, so that rotation of the molded object is possible. The seats are fixed to the drive chains or transport chains. With this known apparatus for treating a molded objects, both drive chains have a predetermined and fixed separation from one another. In order to be able to treat molded objects with different lengths, different-length holding bolts are used. This has the disadvantage that a plurality of different holding bolts have to be kept. Furthermore, for stability reasons, not all lengths of holding bolts can be used. These known measures are complicated, time-consuming, and expensive.

In addition, it is known to widen a drive chain or transport chain transversely to the travel direction in order to accommodate molded objects of different lengths. This necessitates a complicated adjustment. In addition, a batch of molded objects must always be run through the treatment device before the device can be set to another length of the molded objects by widening of its drive chain. The known measures are thus in need of improvement.

OBJECTS OF THE INVENTION

It is therefore an object of the present invention to provide an improved apparatus for treating a molded object.

Another object is the provision of such an improved apparatus for treating a molded object that overcomes the above-given disadvantages, in particular that makes it possible to convey or to treat molded objects of different lengths and that nevertheless is marked by simplicity and low effort or cost.

SUMMARY OF THE INVENTION

To attain this object, the invention proposes an apparatus for treating a molded object having at least one treatment station into which the molded objects may be fed by a conveyor for treatment, wherein the conveyor has at least one conveyor strand extending in the travel direction of the molded objects, wherein the conveyor strand—preferably at least two conveyor strands—is/are movable in the travel direction of the molded objects, wherein at least two holding bolts are provided that can be or are fixed to opposite ends of a molded object, at least one holding bolt being connected to a conveyor strand—preferably two holding bolts, each connected to a respective conveyor strand—so that the respective molded object can be moved or conveyed by the moving conveyor strand or strands, wherein at least one or a first conveyor strand has a plurality of connecting elements extending away from it in the travel direction, wherein the first holding bolt of this first conveyor strand is connected to at least one connecting element of this first conveyor strand, wherein the length L at least some of these connecting elements, preferably all connecting elements corresponds to at least 30% of the length $l_Z$ of the bolt section of the first holding bolt, which bolt section extends between the molded object or the end of the molded object facing the first conveyor strand and the first conveyor strand, and/or corresponds to at least 10%, preferably at least 15%, of the length $l_F$ of the molded object, and/or is at least 30 mm, preferably at least 35 mm.

According to one embodiment, the molded objects are longer transversely of their travel direction than in the travel direction. The length of the molded object in the travel direction and transversely to the travel direction can however be equal, or the length in the travel direction can be greater than the length transversely to the travel direction. It furthermore lies within the scope of the invention that the longitudinal axis of the molded objects during their conveyance through the apparatus according to the invention extends transversely or perpendicular to the travel direction. Advantageously, the molded objects are cylindrical or essentially cylindrical, or at least cylindrical or essentially cylindrical with respect to the mid-range of their longitudinal axis. The molded objects preferably are round, circular, oval, or elliptical in cross section. But basically the molded objects or the voluminous molded objects can also have other geometric designs. It is within the scope of the invention that one holding bolt is fixed to each of the opposite ends of a molded object on its longitudinal axis. Advantageously, the molded objects are rounded or dome-shaped at their outer ends at the holding bolts. The molded objects can be containers such as bottles or the like, or pipes, or similar hollow bodies.

It is recommended that the conveyor strands be linear or essentially linear conveyor strands extending in the travel direction. Advantageously, the conveyor strands are parallel or essentially in parallel to one another.

It is within the scope of the invention that the connecting elements are moved by at least one conveyor strand or by two or at least two synchronously moving conveyor strands in the travel direction. Advantageously, the connecting elements are linear connecting elements that extend transversely to the travel direction and preferably perpendicular to the travel direction or to the first conveyor strand. Advantageously the connecting elements are spaced apart in the travel direction. Furthermore, it is within the scope of the invention that the lengths L, $l_Z$, and $l_F$ are measured transversely or perpendicular to the travel direction or in the direction of the longitudinal axis of the molded object.

According to an especially preferred embodiment of the invention, the treatment station is a treatment chamber or a thermal treatment chamber into which the molded objects are guided for thermal treatment. In accordance with an especially recommended embodiment, the treatment chamber is a thermal hardening chamber for hardening the molded objects or the surfaces of the molded objects. Further, it lies within the scope of the invention that the molded objects are treated in the thermal treatment chamber at an elevated temperature, so that in particular the surfaces or surface areas of the molded objects can harden. Advantageously, the thermal treatment chamber is part of a tunnel oven. According to one embodiment of the invention, the treatment station can also have at least one coating station, for example a painting station, or can be a coating station, for example as a painting station. The coating station or painting station can be integrated in the treatment oven or can be connected downstream of the treatment oven. It is within the scope of the invention that the molded objects of the conveyor can be guided through the coating station, for example through the painting station.

An especially proven embodiment is characterized in that the molded objects are coil cores that at least on the molded object surface have wound fibers or fiber strands impregnated with liquid duroplast. It is within the scope of the invention that the liquid medium or the liquid duroplast resin is hardened in the treatment station or in the thermal treatment chamber. The wound fibers or fiber strands are preferably carbon fibers, glass fibers, aramid fibers, and/or plastic fibers. Basically however other types of fibers can also be used. According to one embodiment, the impregnated fibers or the impregnated fiber strands are wound on a mold carrier made of plastic and/or metal.

It is within the scope of the invention that a rotary drive is provided for rotating the molded objects about their longitudinal axes, and that at least one holding bolt—preferably at least two or both holding bolts—is/are connected via at least one pivot bearing, and preferably is/are mounted on at least one pivot bearing, and that at least one or at least the first holding bolt is connected via at least one pivot bearing to at least one connecting element of the first conveyor strand. The pivot bearings allow rotation or twisting of the holding bolts and the molded objects connected thereto. Advantageously, one holding bolt is connected via a pivot bearing to a conveyor strand—preferably to the second conveyor strand, and, it is recommended, is connected to this conveyor strand via a mount, to be described below. Preferably, the other holding bolt or the first holding bolt is connected via a pivot bearing—advantageously by a connecting body to be described below—to at least one connecting element of the first conveyor strand. The recommended rotation of the molded objects that is provided serves in particular to avoid dripping and assure uniform distribution of the provided liquid medium or liquid plastic on the molded object surface.

According to a proven embodiment of the invention, the device is a rotation element extending in the travel direction, and a holding bolt interacts with the rotation element for rotating the molded object. Preferably the rotation element is a rotary chain and/or a rotary rack and pinion, and the holding bolt of the rotary drive meshes with the rotation element with at least one of the sprockets secured to the holding bolt. It is recommended that the rotation element is fixed. Also the rotation element could be movable counter to the travel direction or in the travel direction. It is within the scope of the invention that one or at least one conveyor strand is provided at each of the two ends or outer ends of the molded objects to be conveyed. Furthermore, it is within the scope of the invention that the first holding bolt of a molded object—regardless of the length $l_F$ of the molded object—is connected to the at least one connecting element of the first conveyor strand and that the second holding bolt is connected to the or a second conveyor strand.

A preferred embodiment of the invention is characterized in that the first holding bolt is connected via at least one connecting body to at least one connecting element—preferably to two or at least two connecting elements of the first conveyor strand. Here the connecting body advantageously has one pivot bearing for the first holding bolt, so that the rotation of the holding bolt or the molded object is assured. It is recommended that the connecting body lies only on the at least one connecting element—preferably on the two or at least two connecting elements. One embodiment is distinguished by the fact that the connecting body is slidable in the longitudinal direction of the first holding bolt and preferably can be secured in various positions arranged along the holding bolt. In the here described connector side of the apparatus according to the invention, this is a floating bearing side, while on the other hand, the opposite side of the molded object is advantageously a fixed bearing side. On the fixed bearing side, preferably mounts described below are secured for a pivot bearing of the second holding bolt on the second conveyor strand (fixed bearing).

It is within the scope of the invention that the connecting elements are connecting elements that extend linearly and transversely to the travel direction—preferably the connecting elements are connecting rods, more preferably as connecting rods extending transversely and preferably perpendicular to the travel direction. It is further within the scope of the invention that the connecting elements or the connecting rods are spaced apart in the travel direction and preferably oriented parallel or essentially parallel to one another. It is recommended that the spacing of the connecting elements or the connecting rods in the travel direction is set such that the connecting body provided on the first holding bolt comes to rest on two or at least two connecting elements. Essentially the molded object or the connecting body can also lie on only one connecting element or one connector rod. Here the connecting element or the connector rod can be configured for example as an upwardly open U-shaped connector block. Preferably the connecting body lies only on the connecting elements or connecting rods and there are no further fastening measures for fixing the connecting body on the connecting elements.

According to one embodiment of the invention, the length of the connecting body transversely to the connecting elements is larger or significantly larger than the length of the connecting body in the longitudinal direction of the connecting elements or the connecting rods. Advantageously, this length transversely to the connecting elements or connecting rods is at least two times, preferably at least three times, and more preferably at least four times the length of the connecting body in the longitudinal direction of the connecting element or connecting rods. An especially recommended embodiment of the invention is characterized in that a connecting body is a disk or plate. Here the length of the connecting disk or plate transversely to the connecting elements or connecting rods preferably is dimensioned such that the connecting body comes to rest on one connecting element or preferably on two connecting elements or connecting rods. Advantageously the connecting body comes to rest with its disk edge or plate edge on the connecting elements or connecting rods. According to one embodiment, a connecting disk or plate is round in plan view, preferably circular or oval. Basically however other embodiments of the connecting body are also possible. For a round design of a connecting disk or plate, a part of the connecting body advantageously projects up through or downward and past two connecting elements or connecting rods. It is furthermore within the scope of the invention that a pivot bearing is provided for the first holding bolt in the center or approximately in the center of a connecting disk or plate, so that the first holding bolt passes through the center or approximately through the center of the connecting disk or plate.

Preferably a thickness d of the connecting body transversely to the travel direction or in the longitudinal direction of a connecting element is a maximum of 25%, preferably a maximum of 20%, and very preferably a maximum of 15%, and especially preferably a maximum of 10% of the length L of the connecting elements or the connecting rods.

It is within the scope of the invention that the second holding bolt of a molded object is received in or on one or at least one saddle fixed to the second conveyor strand. Here the second holding bolt preferably is received via at least one pivot bearing on or in a mount. Advantageously, a plurality of mounts are positioned along the second conveyor strand and preferably each is fixed to the second conveyor strand. The mounts are therefore securely arranged on the second conveyor strand according to the recommended embodiment (fixed bearing). An especially recommended embodiment is characterized in that the mounts are seats, and that a pivot bearing that receives the second holding bolt is received in such a seat.

It is within the scope of the invention that at least one conveyor strand of the apparatus according to the invention is a revolving endless conveyor strand, and that especially preferably all conveyor strands are revolving endless conveyor strands. According to the recommended embodiment, at least one conveyor strand and preferably at least two conveyor strands of the device are a drive chain. Such a drive chain here is advantageously a revolving endless chain. It is within the scope of the invention that a drive chain has chain links or link plates that are connected to one another via chain pins or chain rollers. Advantageously, a drive chain is driven in each case by at least one sprocket or the like.

According to a first preferred embodiment of the invention, the connecting elements connect the first conveyor strand on the one side of the molded object—preferably the first drive chain—to a second conveyor strand on the other side of the molded object—preferably with the second drive chain. Here the connecting elements preferably are connecting rods. In this first embodiment of the invention, the connecting elements extend over the entire length of the molded object. It is recommended that the connecting elements or the connecting rods be spaced apart in the travel direction. Advantageously the two conveyor strands connected by the connecting elements or connecting rods are parallel or essentially parallel to one another. According to a recommended embodiment, the connecting elements or connecting rods of this embodiment are elongated chain pins or chain rollers of the drive chains that connect these two drive chains to one another. Advantageously, the connecting elements or connecting rods are moved by the conveyor strands or drive chains that are connected and synchronously moved thereon in the travel direction.—In this first embodiment of the invention, the length L of at least some of the connecting elements—preferably all of the connecting elements—is greater than the length $l_Z$ of the bolt section of the first holding bolt between the molded object and the first conveyor strand. Preferably this length L of the connecting elements or connecting rods is at least 1.5 times, preferably at least 2 times, and especially preferably at least 2.5 times the length $l_Z$ of the bolt section of the first holding bolt between the molded object and the first conveyor strand. Furthermore, in this first embodiment of the invention, it is recommended that the length L of the connecting elements or connecting rods is greater than the length $l_F$ of the molded object and is preferably at least 1.2 times, preferably at least 1.3 times, and especially preferably at least 1.5 times the length $l_F$ of the molded object. It is further recommended that the length L of the connecting elements or connecting rods in this first embodiment of the invention is at least 150 mm, preferably at least 200 mm, and especially preferably at least 250 mm. A special embodiment of the invention is distinguished by the fact that the length L of the connecting elements or connecting rods is 150 mm to 1000 mm, preferably 150 mm to 750 mm, and very preferably 150 mm to 500 mm.

A second embodiment of the invention is characterized by the fact that on the one side of the molded objects next to the first conveyor strand—preferably next to the first drive chain—there is a further or third conveyor strand—preferably a further or third drive chain—extending in the travel direction. Here it is within the scope of the invention that the first drive chain and the further or third drive chain are connected to one another by the connecting elements—preferably in the form of connecting rods. Furthermore, it is within the scope of the invention that the first conveyor strand and the further or third conveyor strand are parallel or essentially parallel to one another. According to an embodiment of the invention, the two conveyor strands are drive chains and preferably these two drive chains are connected to one another by their elongated chain pins or chain rollers. In principle the assembly of the first and third conveyor strand can be at the same height as the second conveyor strand. But according to an embodiment of the invention, however, the assembly can also lie at a different height or at a different vertical height with respect to the second drive chain. It is within the scope of the invention that in this second embodiment the length L of the connecting elements or connecting rods connecting the first and the third conveyor strand is less than the length $l_Z$ of the bolt section of the first holding bolt arranged between the molded object and the first conveyor strand. The length $l_Z$ of this bolt section here is measured between the molded object or the end of the molded object and the first conveyor strand an outside conveyor strand. Advantageously the length L is at least 35%, preferably at least 40%, and according to one embodiment at least 50% of the length $l_Z$ of the respective bolt section.

A third preferred embodiment of the invention is characterized in that the first conveyor strand—preferably the first drive chain—has at least two partial conveyor strands, or two partial conveyor strands extending in the travel direction—preferably partial drive chains, and the two partial conveyor strands are connected or fixed to one another via the connecting elements—preferably in the form of connecting rods. Here it is within the scope of the invention that a conveyor strand or a partial drive chain is formed by chain links or link plates of the one side of the drive chain arranged one behind the other, and the other partial drive chain is formed by chain links or link plates of the second side of the drive chain arranged one behind the other, and that the two partial drive chains are connected to one another via the chain pins or chain rollers of the drive chain. Here therefore the chain pins or chain rollers form the connecting elements or connecting rods. The assembly or the two partial drive chains connected to one another via the connecting elements can be arranged at the same height as the second conveyor strand. But basically the second conveyor strand can be positioned at a different height or at a different vertical height. The length L of the connecting elements or the connecting elements chain pins/chain rollers is preferably 0.8 times to 4 times the length $l_Z$ of the bolt section of the first holding bolt between the first molded object and first conveyor strand. Preferably the length L of the connecting elements is at least 10%, preferably at least 15%, and very preferably at least 20% of the length $l_F$ of the molded object.

It is within the scope of the invention that the holding bolt or the two holding bolts are rotationally fixed in the molded object, and preferably each is screwed into the molded object. Here the holding bolts are aligned on the longitudinal axis of the molded object. Alignment of the holding bolts with one another or with the longitudinal axis of the molded objects is not absolutely necessary in the scope of the embodiment according to the invention.

The invention is based on the insight that with the apparatus for treating a molded object according to the invention, molded objects of different length or size can be treated simply and in a less expensive manner, and in particular can be hardened in a hardening chamber. Here the device can be operated effectively and simply with different molded objects of different dimensions, and complex adjustment measures or component replacements are not necessary in comparison with the state of the art. Basically the same holding bolts can be used for molded objects of different length can be used or fixed to the molded objects. Nonetheless, the different molded objects can be reliably and precisely transported into the treatment station or conveyed through the treatment station. It should also be emphasized that the apparatus according to the invention is generally less complexly designed. Thus the maintenance and repair operations are simpler and less expensive.

BRIEF DESCRIPTION OF THE DRAWING

The above and other objects, features, and advantages will become more readily apparent from the following description, reference being made to the accompanying drawing in which:

FIG. 1 is a perspective view of an apparatus for treating a molded object according to the invention;
FIG. 2 is a cross section through a first embodiment of FIG. 1;
FIG. 4 shows a second embodiment of the structure according to FIG. 2;
FIG. 6 a cross section from FIG. 5;
and
FIG. 7 a cross section like FIG. 5 through a different embodiment.

SPECIFIC DESCRIPTION OF THE INVENTION

Figure 3B:
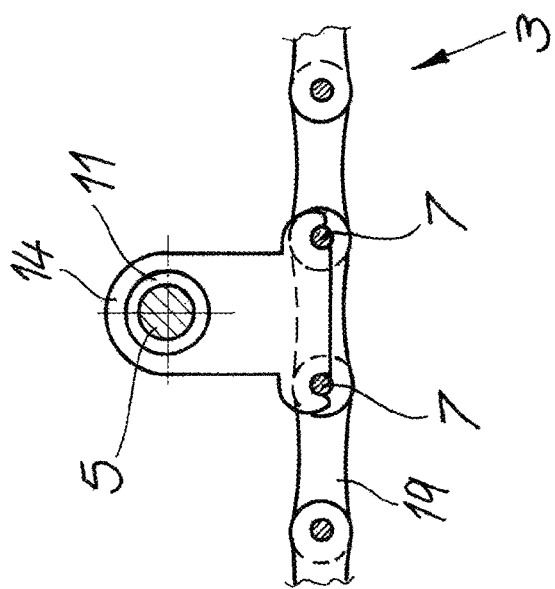
FIGS. 3A and 3B are sections from FIG. 2.

An apparatus a molded object according to the invention moves objects with a conveyor 2 into and through at least one treatment station. Here the molded objects 1 are guided or conveyed through a thermal treatment chamber B of a tunnel oven D. The molded objects 1 are coil cores that have on their surface fiber strands impregnated with liquid duroplast plastic. In the thermal treatment chamber B these molded objects 1 or coil cores are heated so that the molded objects 1 or the surfaces of the molded objects 1 are hardened. The coil cores are a relatively sensitive molded object 1, so that conveyance and hardening must be reliable and precise.

The conveyor 22 for conveying the molded objects 1 through the thermal treatment chamber B has in all illustrated embodiments two or at least two conveyor strands 3 and 4 that in this embodiment are drive chains extending in a travel direction F of the molded objects 1. These drive strands 3 and 4 drive chains can move the molded objects 1 in the travel direction F through the thermal treatment chamber B of the tunnel oven D. Two holding bolts 5 and 6 are connected to each of the molded objects 1 and are in this embodiment screwed into the molded object 1 to be rotationally fixed therein. These holding bolts 5 and 6 are each connected to a respective drive chain or a conveyor strand 3 and 4, so that the respective molded object 1 can be conveyed by the synchronously moving conveyor strands 3 and 4 in the travel direction F. According to the invention the first conveyor strand 3 or the first drive chain has a plurality of connecting elements 7 extending transversely—here perpendicularly—to the travel direction F. Here the first holding bolt 5 of the first conveyor strand 3 is connected to the two connecting elements 7 of the first conveyor strand 3. The connecting elements 7 are preferably and in this embodiment figured as connecting rods extending transversely or perpendicular to the travel direction F.

It is within the scope of the invention that the length L of the connecting elements 7 corresponds to at least 20% of the length $l_Z$ of the bolt section of the first holding bolt 5, which bolt section extends between the molded object 5, or the end of the molded object 1 facing the first conveyor strand 3, and the first conveyor strand 3 and/or this length L corresponds to at least 10%, preferably 15% of the length $l_F$ of the molded object 1 and/or the length L is at least 30 mm, preferably at least 35 mm.

It is within the scope of the invention that the molded objects 1 are transported while rotating through the thermal treatment chamber B of the tunnel oven D. In this way, on the one hand dripping of the liquid duroplast plastic can be avoided, and on the other uniform distribution of this liquid plastic can be assured. For this purpose, the apparatus according to the invention preferably has a rotary drive 10 to turn the molded objects 1 about their longitudinal axes. To this end the two holding bolts 5 and 6 are each carried on a pivot bearing 11. The first holding bolt 5, preferably and here, is connected to the connecting elements 7 via such a pivot bearing 11. According to a recommended embodiment and here, the rotary drive is configured in the form of a rotation element 12 extending in the travel direction F, wherein this rotation element 12 preferably and here is a rotary chain. Preferably and here there is an interaction between the second holding bolt 6 and the rotary chain so as to rotate the molded object 1, wherein the second holding bolt 6 meshes, by a sprocket secured to this holding bolt 6, with the rotary chain. Preferably and here the rotation element 12 or the rotary chain is fixed in place, and thus does not move in or opposite to the travel direction F.

The figures show that a conveyor strands 3 and 4 are each at a respective one of the two ends of the molded objects 1. As already shown above, here the first holding bolt 5 of each molded object 1 is connected to the connecting elements 7 of the first drive chain or the first conveyor strand 3. The second holding bolt 6 of each molded object 1 is connected here to the second drive chain or to the second conveyor strand 4. Preferably and here, the first holding bolt 5 is connected by a respective connecting body 14 to the connecting elements 7 or the connecting rods of the first conveyor strand 3. Preferably and here, the connecting body 14 sits on only two connecting rods. The connecting body 14 with the first holding bolt 5 and the molded object 1 connected thereon is thus slidable transversely of the travel direction F. In the present case this connector side of the molded object 1 is the floating bearing side.

Figure 3A:
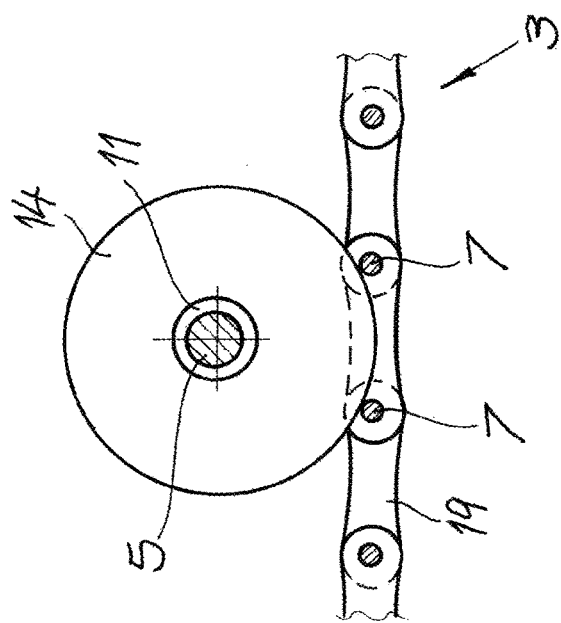

Preferably and here, the connecting body 14 is a disk and thus its length transversely to the connecting rods is markedly greater than in the longitudinal direction of the connecting rods. Here, the disk 14 lies with its disk edge on two connecting rods or connecting elements 7. FIG. 3A shows an embodiment of the disk. Here this disk 14 is circular. FIG. 3B shows a different embodiment for the connecting body 14. In both cases, the pivot bearing 11 is in the connecting body 14, and the first holding bolt 5 extends through this pivot bearing so that the first holding bolt 5 or the molded object 1 connected thereon is rotatable relative to the connecting body 14.

Advantageously and here, the second holding bolt 6 of a molded object 1 is received by a pivot bearing 11 on a saddle 15 fixed to the second drive chain or the second conveyor strand 4. Such a saddle 15 is configured here as a seat. A plurality of such mounts 15 or seats is positioned along the second drive chain, and fixed to this second drive chain or the second conveyor strand 4. In this case, the connector side of the molded object 1 is the fixed bearing side.

Preferably and here, the conveyor strands 3 and 4 are revolving endless drive chains. It is within the scope of the invention that for the drive chains, chain links 19 or link plates are connected to one another in a manner that is routine per se via chain pins 20 or chain rollers. The endless drive chains are advantageously driven via a sprocket or the like.

FIG. 2 shows a first embodiment of the apparatus according to the invention. Here the connecting elements 7 connecting rods connect the first drive chain or the first conveyor strand 3 to the second drive chain or the second conveyor strand 4. Thus the connecting elements 7 or the connecting rods extend over the entire space between the two conveyor strands 3 and 4 and thus also over the entire length $l_F$ of the molded object 1. The connecting rods here are arranged at a spacing one after the other in the travel direction F. In this embodiment, the connecting elements 7 or connecting rods can be elongated chain links of the two drive chains or conveyor strands 3. It is within the scope of the invention that the connecting elements 7 or the connecting rods are moved in the travel direction F with the two drive chains moving synchronously in the travel direction F. FIG. 2 shows that with this embodiment the length L of the connecting elements 7 or connecting rods is preferably greater or significantly greater than the length $l_Z$ of the bolt section of the first holding bolt 5 between the molded object 1 and the first conveyor strand. Preferably this length L is at least twice as great as the length $l_Z$ of the bolt section of the first holding bolt. The length L of the connecting elements 7 is generally here and hereinafter advantageously measured between the inner elements or chain links of the involved conveyor strands 3 and 4, and 16. This will become clear from FIGS. 2, 4, and 5.

FIG. 4 shows a second embodiment of the apparatus according to the invention. Here on the one side of the molded objects 1, next to the first drive chain or next to the first conveyor strand 3, there is a further or third conveyor strand 16 that preferably also is a further conveyor chain and extends in the travel direction F. It is therefore in the scope of the invention that the first conveyor strand 3 and this further or third conveyor strand 16 are connected to one another via the connecting elements 7—preferably and here in the form of conveyor strands. Here the first conveyor strand 3 and the third conveyor strand 16 extend parallel to one another in the travel direction F and are moved synchronously in the travel direction F. The connecting elements 7 connecting the two conveyor strands 3 and 16 can be elongated chain pins 20 of the two conveyor strands 3 and 16 drive chains. Here FIG. 4 shows that the second conveyor strand 4 in comparison with the assembly of the first conveyor strand and the third conveyor strand 16 is arranged at a different vertical height, so that a height difference Δh results. Apart from that, FIG. 4 shows that it is within the scope of the invention that for this embodiment the length L of the connecting elements 7 is less than the length $l_Z$ of the bolt section of the first holding bolt 5. Basically however, other variants are also conceivable, in which even in this second embodiment the length L is equal to or greater than the length $l_Z$ of the bolt section of the first holding bolt 5.

Figure 5:
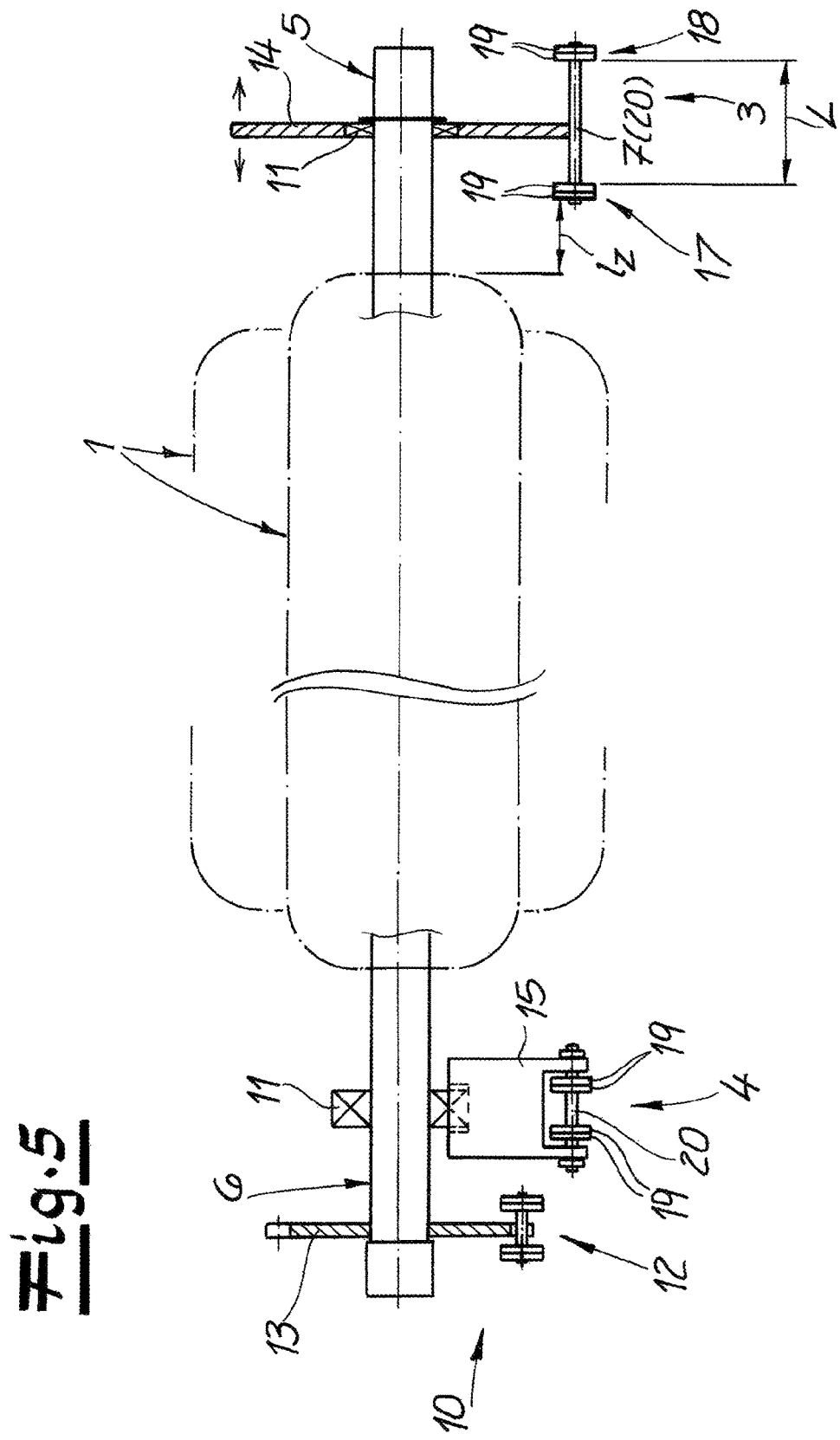
FIG. 5 shows a third embodiment of the structure according to FIG. 2.

FIG. 5 shows a third embodiment of the apparatus according to the invention. Here the first conveyor strand 3 or the first drive chain is composed of two partial conveyor strands 17 and 18 extending in the travel direction F, and these partial conveyor strands 17 and 18 are connected to one another via the connecting elements 7. The partial conveyor strands 17 and 18 here are the left and the right row respectively of the chain links 19 of the first drive chain arranged one behind the other, and the connecting elements 7 are elongated chain pins of these widened first drive chains. Thus the term connecting elements 7 with reference to this embodiment according to FIG. 5 also means elongated connecting elements or chain pins 20 of a widened first drive chain or a widened first conveyor strand 3.

FIG. 6 shows a detail view the right side of the structure of FIG. 5. This shows that for this embodiment, two molded objects 1 with very different diameters and very different lengths $l_F$ can be guided or transported with the same first holding bolt 5 and the same connecting body 14. The only prerequisite for this is that the diameter of the disk 14 is greater than the diameter of the molded object 1 with smaller diameter that projects into the area of the first conveyor strand 3. Thus it is possible without problems to connect molded objects of different sizes with the same relatively small connecting body 14. The shorter molded object with the larger diameter can fit in the area below the first conveyor strand 3 here according to FIG. 6. Apart from that, these advantages can also be achieved here of the apparatus according to the invention in FIG. 4.

In FIG. 7, also a detail the right side of FIG. 5 is shown but in a different embodiment. The first holding bolt 5 is connected in a rotationally fixed manner to the connecting body 14. To assure rotation of the assembly consisting of the molded object 1, the holding bolts 5, and the connecting body 14, the connecting body 14 can also roll over roller sleeves 21 on the first conveyor strand 3. The roller sleeves 21 are advantageously rotationally mounted on the connecting elements 7, and it is within the scope of the invention that the roller sleeves 21 can rotate about the longitudinal axis of the respective connecting elements 7. This embodiment can thus be selected in place of the embodiment with the pivot bearing 11 arranged in the connecting body 14. Apart from that, a corresponding arrangement can also be provided on the second conveyor strand 4, so that then preferably a pivot bearing 11 can be omitted on the saddle 15, and instead of that roller sleeves 21 can be provided on the second conveyor strand 4 for rolling on the saddle 15.

I claim:

1. An apparatus for treating a plurality of molded objects all having a predetermined object length one after the other in a treatment station, the apparatus comprising:
    first and second transversely spaced conveyor strands extending longitudinally in a travel direction into the treatment station for displacing the objects in the travel direction into the treatment station;
    respective pluralities of first holding bolts and second holding bolts supported by the respective first and second strands and secured in respective ends of the objects with the objects extending transversely between the strands;
    respective first connecting bodies on each of the first holding bolts at the first strand; and
    a plurality of longitudinally spaced and transversely extending support elements fixed to and longitudinally displaceable with the first strand, the first bolts being supported by the respective first connecting bodies on the support elements, each support element having a transverse length equal to at least
    30% of a length of the first holding bolt between the respective end of the respective molded object and the first conveyor strand, or
    10% of the length of the molded objects, or
    30 mm, each of the first connecting bodies being slidable transversely of the direction on the respective support element substantially along the full transverse length thereof.

2. The treatment apparatus defined in claim 1, wherein the treatment station is a thermal hardening chamber into which the molded objects are conveyed for thermal treatment.

3. The treatment apparatus defined in claim 1, wherein the objects extend transversely along respective axes between the respective first and second bolts, the apparatus further comprising:
    respective bearings supporting the first and second bolts on the first and second strands for rotation of the objects about the respective axes;
    means on the second strand for rotating the molded objects and their bolts about the axes.

4. The treatment apparatus defined in claim 3 wherein the means for rotating includes:
    a respective sprocket on each of the second bolts; and
    a longitudinally extending chain or rack extending along the second strand and meshing with the sprockets, whereby longitudinal movement of the second strands rolls the sprockets in the chain or rack to rotate the respective objects.

5. The treatment apparatus defined in claim 3 wherein the first and second conveyor strands are oriented underneath outer ends of the first second bolts.

6. The treatment apparatus defined in claim 3, wherein the first connecting bodies each hold the bearing of the respective first holding bolt and each rest on two of the support elements of the first strand.

7. The treatment apparatus defined in claim 6 wherein each connecting body is a disk or a plate.

8. The treatment apparatus defined in claim 6, a thickness of each connecting body transversely to the travel direction is a maximum of 25% of the length of the respective connecting element.

9. The treatment apparatus defined in claim 6, further comprising:
    respective second connecting bodies each holding the bearing of the respective second holding bolt and space apart along the second conveyor strand; and
    respective saddles longitudinally spaced on the second strand and each cradling a respective one of the second connecting bodies.

10. The treatment apparatus defined in claim 1, wherein each strand is formed by a respective endless chain formed by two longitudinally extending series of links connected by transversely connecting pins.

11. The treatment apparatus defined in claim 10, wherein the support elements are formed as extensions of the pins of the chain of the first strand.

12. The treatment apparatus defined in claim 10, further comprising:
    a third strand between the first and second strands, movable synchronously with the first strand, and fixed to inner ends of the support elements.

13. The treatment apparatus defined in claim 10, wherein the connecting elements are the pins of the chain of the first strand.

14. The treatment apparatus defined in claim 1 wherein the holding bolts are screwed into the respective ends of the objects.

* * * * *